May 6, 1930. D. L. VAN LEUVEN 1,757,759
RUNNING GEAR
Filed Oct. 1, 1927
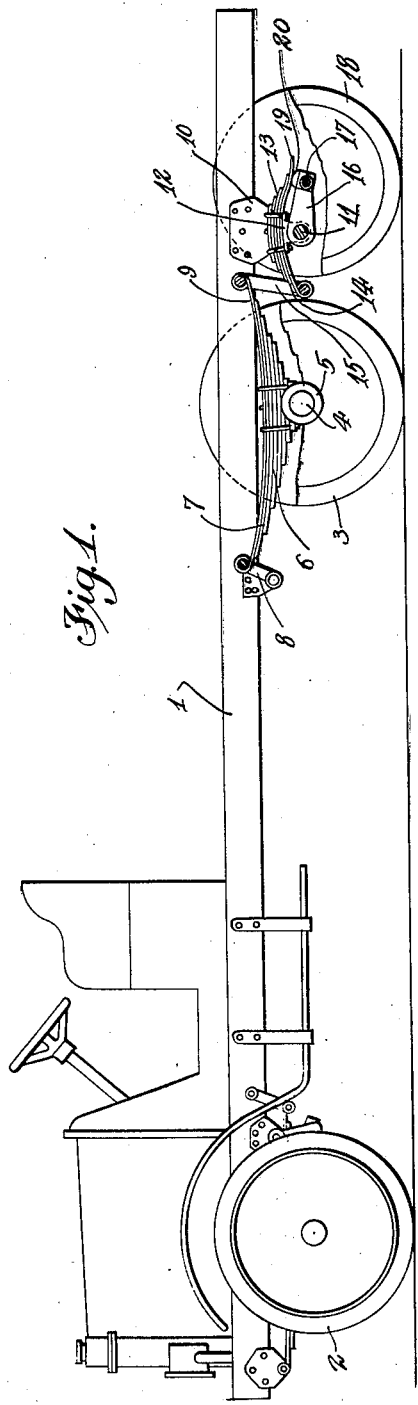
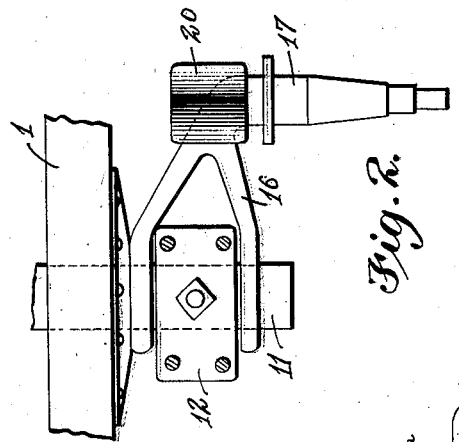
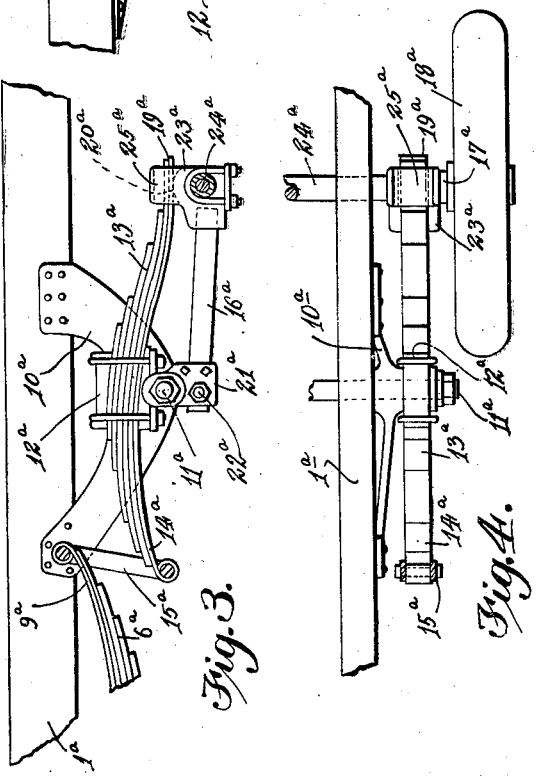
Inventor
David L. Van Leuven
By Lyon & Lyon Attorneys Patented May 6, 1930

1,757,759

UNITED STATES PATENT OFFICE

DAVID L. VAN LEUVEN, OF LOS ANGELES, CALIFORNIA, ASSIGNOR TO SIX WHEEL CORPORATION, OF LOS ANGELES, CALIFORNIA, A CORPORATION OF CALIFORNIA

RUNNING GEAR

Application filed October 1, 1927. Serial No. 223,338.

This invention relates to running gears of motor vehicles, and more particularly to that type having a plurality of pairs of rear wheels adapted to the running gear of the motor vehicle as an attachment. This invention is an improvement over that disclosed in my copending application Serial No. 9939, filed February 18, 1925, for Running gear.

In the adapting of an attachment to the running gear of a motor vehicle in order to provide an auxiliary pair of wheels adapted to sustain a portion of the load formerly carried by the rear wheels of the running gear as originally constructed, difficulty has been encountered in obtaining an attachment which would permit perfect flexibility of the wheels added by the attachment so that these added wheels would assume or maintain their portion of the load throughout all running conditions of road irregularities, turns, and the like.

An object of this invention is to provide a running gear for a motor vehicle including a pair of wheels adapted to the running gear of the motor vehicle as an attachment and adapted independently on the opposite sides of the frame of the motor vehicle so that the wheels may independently compensate for road irregularities and so that the wheels of the attachment function independently to assume and maintain their portion of the load.

Another object of this invention is to provide a six-wheel attachment for motor vehicle running gears including a pair of wheels independently mounted on swivel rocker arms at the opposite sides of the frame and independently connected with the motor vehicle driving wheel suspending means so that the wheels of the attachment act independently to assume the proper portion of the load carried by the running gear of the motor vehicle and function independently under all conditions.

Other objects and advantages of this invention, it is believed, will be apparent from the following detailed description of a preferred embodiment thereof, as illustrated in the accompanying drawings.

In the drawings:

Figure 1 is a side elevation of a motor vehicle chassis illustrating a running gear embodying this invention.

Figure 2 is a fragmental top plan view of the auxiliary wheel attachment embodying this invention.

Figure 3 is a fragmental side elevation illustrating a modified form of auxiliary wheel attachment embodying this invention, with the wheel supporting trunnion broken away.

Figure 4 is a top plan view of a modified form of the auxiliary wheel attachment illustrated in Figure 3.

In the preferred embodiment of this invention illustrated in the accompanying drawings, 1 illustrates the frame of a motor vehicle which may be of any suitable or desirable construction and which is supported at its forward end by means of a pair of wheels 2 which are usually of the steering or dirigible type. The rear of the frame 1 is provided with driving wheels 3. The rear wheels 3 are secured to the axle 4 by means of which the wheels 3 are driven. The axle 4 is driven in any suitable or desirable manner, as is well understood in the art. The axle 4 is mounted within a housing 5 to which springs 6 are secured. The springs 6 provide the suspension means by means of which the rear wheels 3 are suspended from the frame of the vehicle.

The springs 6 are secured at one end 7 by any suitable or desirable means, such as illustrated at 8, to the frame 1. The opposite ends 9 of the springs 6 are free.

Secured at the opposite sides of the frame 1 are brackets 10. The brackets 10 on the opposite sides of the frame are secured together by means of a rod 11. Fulcrumed on the rod 11 at the opposite ends thereof, as illustrated at 12, are laminated springs 13. The springs 13 are at their ends 14 connected with the adjacent free ends 9 of the springs 6 by any suitable or desirable means, as illustrated at 15. Journaled on the rod 11 at its opposite ends are rocker arms 16, which are mounted for independent action on the rod 11. The rocker arms 16 are secured to or formed integral with trunnions 17 upon which the attachment wheels 18 are journaled. Means are provided for securing the opposite or free ends 19 of the laminated springs 13 to the rocker arms 16 so as to connect the attachment wheels 18 with the suspension means of the wheels 3 to cause the attachment wheels 18 to assume a portion of the load carried by the frame 1. As herein illustrated, the free ends 19 of the laminated springs 13 are slidably connected with the rocker arms 16 by engagement with a hardened steel plate 20 secured to the rocker arms 16. This manner of securing the free ends 19 of the springs 13 to the rocker arms 16 permits absolutely free movement of the rocker arms 16 without setting up in the springs 13 undue strains.

The springs 13 serve as the lever connections between the trunnions 17 which support the attachment wheels 18 and the suspension means provided by the springs 6 for the wheels 3 so that the load on the opposite sides of the frame 1 is independently proportioned between the attachment wheel 18 and the wheel 3 on each side of the frame.

As illustrated in Figure 2, the rocker arm 16 is formed as a yoke in order to aline the block 20 with the laminated spring 13.

In the modified form of this invention illustrated in Figures 3 and 4, the construction is entirely the same so that the same reference numerals have been applied with the addition of an exponent "a", except that the rocker arm 16$^a$ is constructed as a bar and is secured to the rod 11$^a$ by means of a clamp 21$^a$. The clamp 21$^a$ provides a bearing by means of which the rocker arm 16$^a$ is journaled on the rod 11$^a$. The clamp 21$^a$ is secured to the rod 16$^a$ by means of a bolt 22$^a$, which passes through the clamp 21$^a$ and the rocker arm 16$^a$. The rocker arm 16$^a$ is secured at its opposite end to a bracket 23$^a$ by any suitable or desirable means such, for example, as welding the end of the rocker arm 16$^a$ to the bracket 23$^a$. The bracket 23$^a$ is secured to the axle 24$^a$ which extends transversely of the frame 1$^a$ and connects the brackets 23$^a$ together. The brackets 23$^a$ also provide saddles 25$^a$ into which the free ends 19$^a$ of the laminated springs 13$^a$ are fitted so as to permit free movement of the ends of the springs 13$^a$. The axle 24$^a$ extends beyond the brackets 23$^a$ and the attachment or ground wheels 18$^a$ are journaled thereon.

While in the modified form of this invention illustrated in Figures 3 and 4 I have herein illustrated the axle 24$^a$ as extending transversely of the frame 1$^a$ and connecting the brackets 23$^a$, it is to be understood that while this construction may be employed, it is preferable that the brackets 23$^a$ be secured to independent trunnions upon which the ground wheels 18 or 18$^a$ are journaled so as to permit free or independent action of the ground wheels 18 or 18$^a$ on the opposite sides of the frame.

Having fully described my invention, it is to be understood that I do not wish to be limited to the details herein set forth, which may obviously be varied without departing from the spirit of my invention as defined by the appended claims.

I claim:

1. The combination with a motor vehicle chassis, including a frame, a pair of drive wheels, and means for suspending the drive wheels from the frame, of a second pair of wheels, separate trunnions upon which the second pair of wheels is journaled, springs fulcrumed intermediate their ends from the frame, means for connecting the springs with the drive wheel suspension means, and means for connecting the springs with the trunnions.

2. In an attachment for motor vehicles, the combination of a bracket, a rocker arm pivotally secured at one end to the bracket, a spring fulcrumed intermediate its ends to the bracket, a rocker arm pivotally supported at one end by the bracket, means for connecting the other end with the spring, a ground wheel, and means for rotatably supporting the ground wheel from the rocker arm.

3. In a six-wheel attachment for motor vehicles, including a frame, a pair of drive wheels for the frame, spring means for suspending the drive wheels from the frame, brackets secured to the opposite sides of the frame, rocker arms pivotally secured at their ends to the brackets, levers fulcrumed intermediate their ends to the brackets, independently operable trunnions carried by the rocker arms, ground wheels journaled on the trunnions, means for securing one end of each lever to a rocker arm, and means for securing the other ends of each lever to the adjacent ends of the drive wheel spring suspending means.

Signed at Los Angeles, California, this 23d day of September, 1927.

DAVID L. VAN LEUVEN.